(12) United States Patent
Toback

(10) Patent No.: US 7,761,973 B2
(45) Date of Patent: Jul. 27, 2010

(54) CONNECTION SYSTEM FOR CONSTRUCTION

(76) Inventor: Alex S. Toback, 65 Fox Chase La., West Hartford, CT (US) 06117

( * ) Notice: Subject to any disclaimer, the term of this patent is extended or adjusted under 35 U.S.C. 154(b) by 1326 days.

(21) Appl. No.: 10/745,211

(22) Filed: Dec. 23, 2003

(65) Prior Publication Data

US 2004/0187289 A1 Sep. 30, 2004

Related U.S. Application Data

(63) Continuation-in-part of application No. 09/639,599, filed on Aug. 16, 2000, now abandoned.

(60) Provisional application No. 60/149,414, filed on Aug. 17, 1999.

(51) Int. Cl.
*B23P 11/00* (2006.01)
*E04H 12/00* (2006.01)

(52) U.S. Cl. ............... 29/525.13; 29/525.01; 29/458; 29/897.3; 52/655.1; 52/698; 403/266; 403/267

(58) Field of Classification Search ............... 29/458, 29/525.01, 525.13, 897.3; 403/265, 266, 403/267, 269, 270; 52/698, 655.1
See application file for complete search history.

(56) References Cited

U.S. PATENT DOCUMENTS

| | | | |
|---|---|---|---|
| 2,650,185 A * | 8/1953 | Larson et. al. | 156/310 |
| 3,022,870 A * | 2/1962 | John et. al. | 403/267 |
| 3,066,060 A * | 11/1962 | Gross | 428/460 |
| 3,655,424 A * | 4/1972 | Orowan | 428/164 |
| 4,426,425 A * | 1/1984 | Good et al. | 428/414 |
| 4,429,158 A * | 1/1984 | Good et al. | 564/455 |
| 4,556,592 A * | 12/1985 | Bannink, Jr. | 428/43 |
| 5,665,187 A * | 9/1997 | Mackellar | 156/91 |
| 6,059,482 A * | 5/2000 | Beauvoir | 403/262 |
| 6,588,969 B2 * | 7/2003 | Hawkins | 403/267 |
| 2009/0202294 A1 * | 8/2009 | Apfel | 403/267 |

* cited by examiner

*Primary Examiner*—Essama Omgba
(74) *Attorney, Agent, or Firm*—Alix, Yale & Ristas, LLP

(57) ABSTRACT

A connection system for steel construction employs both fasteners and an adhesive for connecting panels to a metal frame or metal studs. The connection system also joins metal components such as web stiffeners, hold-down clamps and vertical clips to metal studs and cross-channel members. The fasteners may be a self-drilling screw, rivets, pins, clinches or other mechanical fasteners. The adhesive may be a two-part epoxy system, an acrylic, a urethane or other structural adhesive system designed to bond light gauge steel.

46 Claims, 18 Drawing Sheets

CONNECTION SYSTEM FOR CONSTRUCTION

CROSS-REFERENCE TO RELATED APPLICATION

This application is a continuation-in-part of U.S. patent application Ser. No. 09/639,599 filed on Aug. 16, 2000, now abandoned which claims the priority of U.S. Provisional Application Ser. No. 60/149,414 filed on Aug. 17, 1999.

BACKGROUND OF THE INVENTION

This invention relates generally to connectors and connection systems for light gauge steel construction and the like. More particularly, this invention relates to methods and fastening systems employed for connecting light gauge steel employed in the construction trades for housing and structures and the like.

In conventional systems to which the invention relates, load distribution codes in light steel connections are entirely satisfied by the use of screws. In such conventional systems, numerous screws or fasteners are required to provide the connection, and self-drilling screws are preferred.

BRIEF SUMMARY OF THE INVENTION

The present invention takes a novel approach by providing a light gauge steel connection having an enhanced load bearing capacity through the use of both fasteners and a structural adhesive. By using a structural adhesive, the number of required fasteners is significantly decreased while the load bearing capacity and durability of the connection is increased.

The application can be employed with numerous mechanical fasteners such as self-drilling screws, pins, rivets and clinches. The adhesive is preferably a two-part epoxy adhesive system with a one to one metered mix formulation which cures at room temperature and has a very high viscosity. The adhesive may also be a methacrylate or a urethane.

Briefly stated, the invention in a preferred form is a method for connecting a light gauge steel panel to a support frame comprised of steel members and to the resulting assembly thereof. The method comprises applying an adhesive to at least one of the panel or the support frame, placing the panel against the support frame, driving a plurality of fasteners into the panel and the support frame to provide an aggregate mechanical connection to maintain the panel position against the support frame when the support frame is positioned in an upright orientation. The adhesive is allowed to cure to form a bonding interface between the panel and the frame, so that the panel is joined to the frame along a bonding interface in a connection wherein the shear connection resistance to a shear load parallel to said panel is substantially entirely provided by the bonding interface which is significantly greater in load bearing capacity than the aggregate mechanical connection provided by the fasteners.

The adhesive may be applied in the form of beads to both the panel and the support frame. In one form of the invention, each fastener is a self-drilling screw which is drilled into the support frame.

One form of an assembly for a building in accordance with the present invention comprises a metal support frame comprising a pair of opposed metal members. A panel of light gauge of steel is mounted to the support frame. A plurality of mechanical fasteners connects the panel to the support frame and has an aggregate mechanical load bearing capacity sufficient to retain the panel to the support frame. A structural adhesive curable at room temperature is disposed between the support frame and the panel and forms a bonding interface between the panel and the members so that the panel is joined to the frame in a connection wherein the connection resistance to a shear load applied parallel to the panel is substantially entirely provided by the bonding interface, which is significantly greater in load bearing capacity than that of the aggregate mechanical load bearing capacity of the fasteners. In one form of the invention, the epoxy comprises a resin and a hardener which are mixed in substantially equal portions by weight. In another embodiment, the resin and hardener are mixed in substantially equal portions by volume. Other portions are also suitable.

In another embodiment of the invention, a shear wall comprises a metal support frame comprising pairs of laterally spaced metal studs. A panel of oriented strand board is mounted to the support frame. A plurality of mechanical fasteners connects the panel to the support frame and has an aggregate load bearing capacity sufficient to retain the panel to the support frame. A structural adhesive is disposed between the support frame and the panel to form a bonding interface between the panel and the stud so that the panel is joined to the frame in a connection wherein the connection resistance to a shear load applied parallel to the panel is substantially entirely provided by the bonding interface which is significantly greater in load bearing capacity than that of the aggregate mechanical load bearing capacity of the fasteners. Each of the fasteners may be a self-drilling screw. The mean distance between the fasteners is at least two inches, but with a suitable adhesive the mean fastener spacing is much greater. The adhesive may be a two-part epoxy system or a methyl methacrylate product.

In another embodiment, a connected sub-assembly for a building comprises a C-shaped metal member having a web disposed between a pair of spaced metal edge strips. A metal component is mounted to the web. At least one mechanical fastener connects the component to the web and has an aggregate mechanical load bearing capacity sufficient to retain the component to the web. A structural adhesive is also disposed between the component and the web and forms a bonding interface between the component and the web so that the component is joined to the member in a connection wherein the connection resistance to a shear load applied to the connector is substantial entirely provided by the bonding interface which is significantly greater in load bearing capacity than that of the aggregate mechanical load bearing capacity of the at least one fastener and is also greater than the load which would cause failure of the component. The fasteners may be pneumatically driven pins.

The metal component may be a web stiffener, a wall holddown anchor or a vertical clip. The C-shaped metal member may be a stud or a cross-channel member. The connection system may be employed for numerous construction applications which involve connecting metal studs, cross-channel tracks, corrugated sheets, L-shaped headers, joists and other components.

DETAILED DESCRIPTION OF THE PREFERRED EMBODIMENTS

Figure 1A:
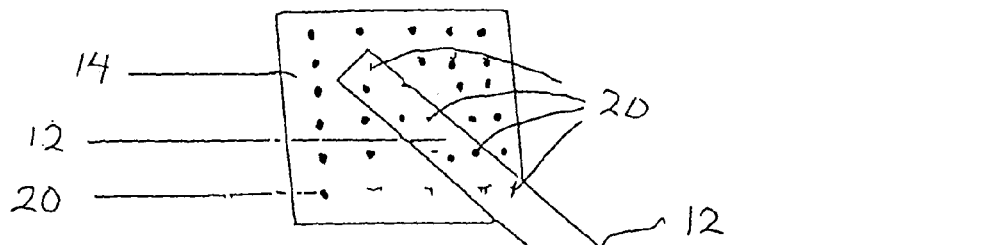
FIG. 1(a) is a schematic representational view of a prior art fastening system connecting a steel stiffening strap in a shear wall application with gusset plates.
Figure 1B:
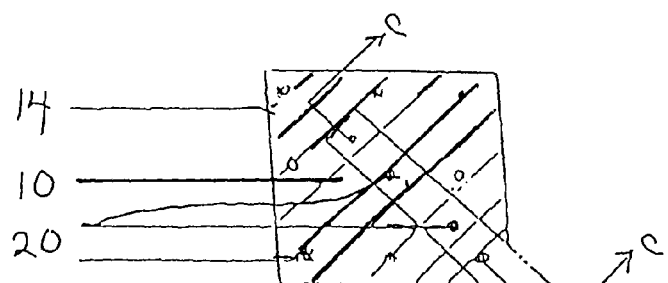
FIG. 1(b) is a schematic representational view illustrating, by contrast with FIG. 1(a), the connection system of the present invention.
Figure 1C:
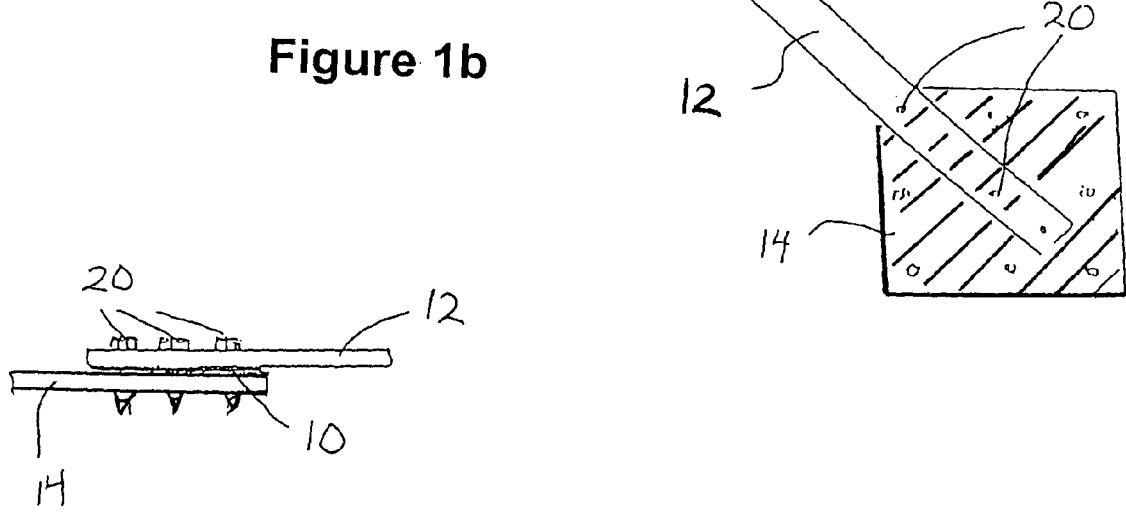
FIG. 1(c) is a fragmentary sectional view of the connection system of 1(b) taken along the line c-c thereof.

The invention is schematically illustrated by FIGS. 1(a) and 1(b) which contrast the conventional design (FIG. 1(a)) with the adhesive/fastener design of the present invention (FIG. 1(b)). With reference to FIG. 1(a), a conventional stiffening strap 12 is illustrated in a shear wall 13 application with gusset plates 14. Numerous fasteners 20 are required.

By contrast, the present invention, which employs both an adhesive 10 and fasteners 20, dramatically reduces the number of required fasteners (schematically illustrated) while enhancing the load bearing capacity and integrity of the connection.

The adhesive 10 which is employed in the system is selected so as to have a high shear and peel strength, room temperature curing and easy application characteristics at room temperature. The adhesive is also tough, does not fail adhesively under loads and is capable of adhering to as-received galvanized steel. The adhesive 10 may be applied to the metal panel 30 and/or the support structure 40, such as a stud, by a hand operated or automatic dispensing device 16.

In one embodiment of the invention, the adhesive 10 fully cured at room temperature within 72 hours. One acceptable adhesive employed in the invention is an adhesive sold as Formulation No. 12059A marketed by the Advanced Adhesive Systems, Inc., of Newington, Conn. The adhesive is a two part epoxy system having a substantially 1:1 resin/hardener mix by weight or volume which has a very high viscosity and cures at room temperature. This formulation upon curing has a Shore D of 40-45 and an operating temperature range of −40° F. to 250° F. The adhesive 10 may also be another room temperature or heat activated adhesion system such as a methacrylate, urethane, etc.

Figure 8:
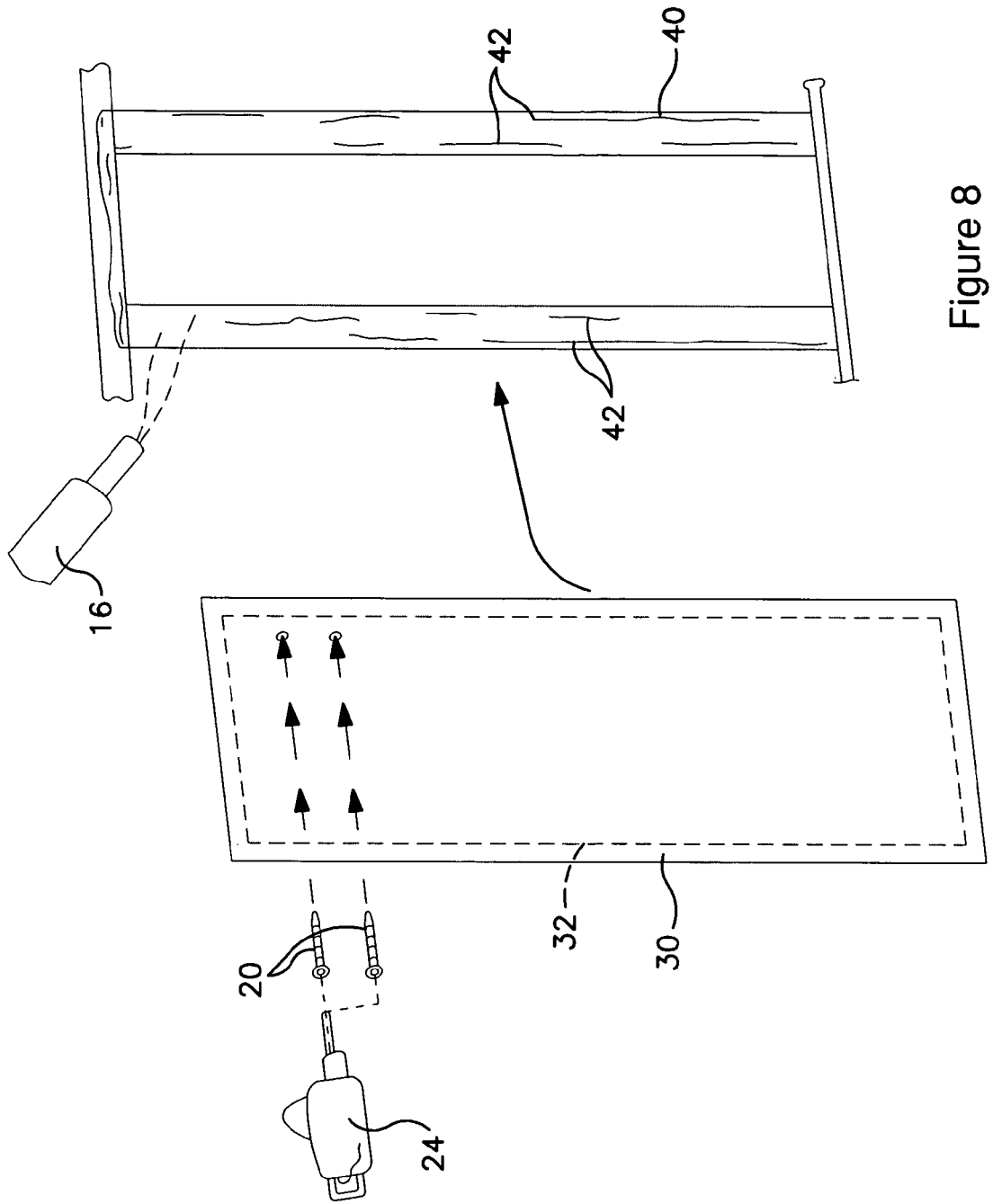
FIG. 8 is a schematic representational diagram illustrating one embodiment of the invention.

With reference to FIG. 8, in accordance with one embodiment of the invention, the adhesive is applied to one or both of the steel surfaces to form beads 32 and/or 42. The other panel 30 is placed in an overlapping relationship against the stud 40. Self-drilling fasteners 20 are then inserted through the panels by power driver 24 and the adhesive is compressed between the panel 30 and the stud 40. The fasteners 20 are preferably Metaltite™ self-drilling metal panel fasteners (disclosed in U.S. Pat. No. 5,304,023) because of their high resistance to pull-out. The adhesive is then allowed to cure.

Figure 2:
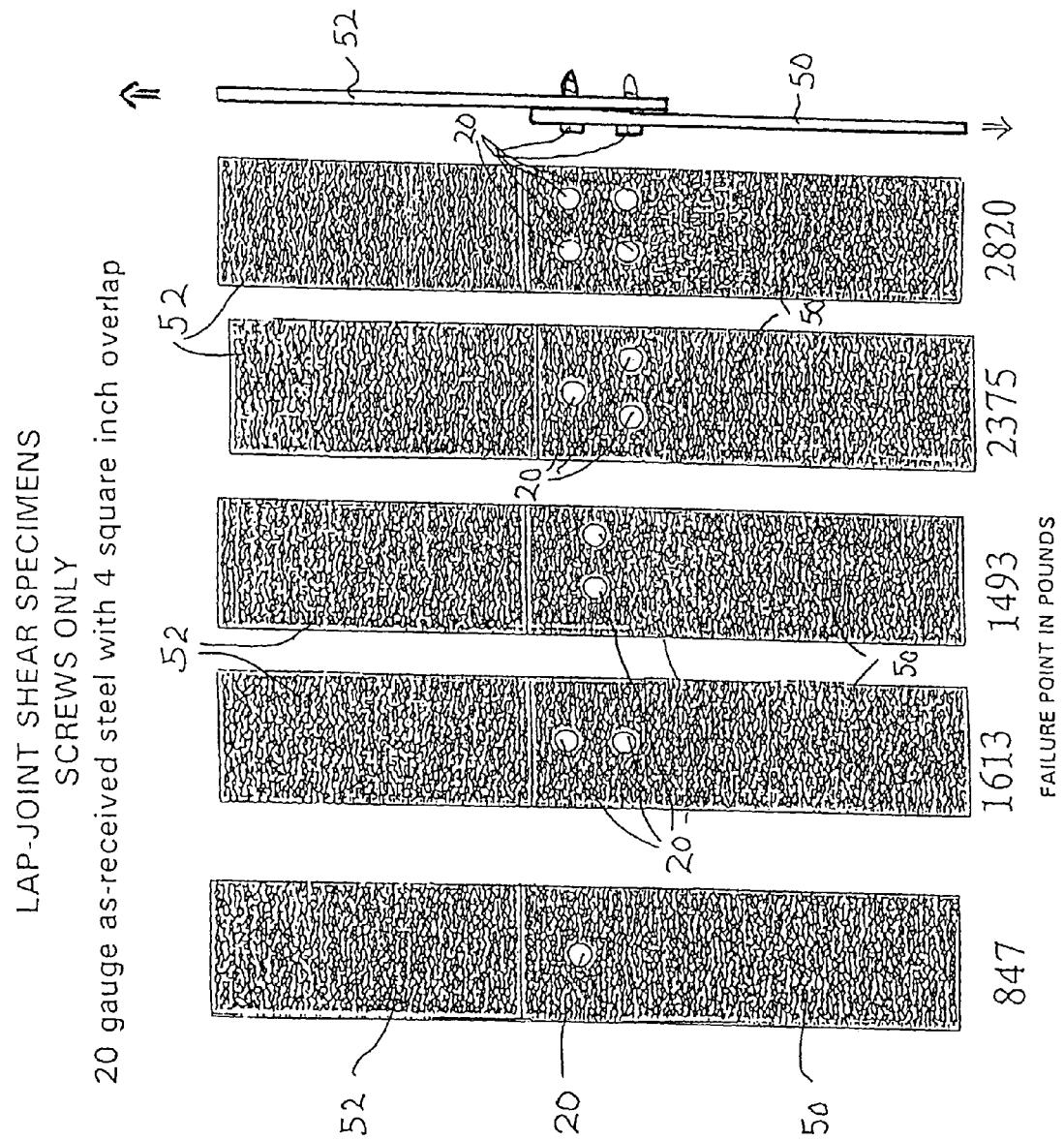
FIG. 2 is a schematic representational diagram illustrating a prior art connection system for 20 gauge steel strips which are connected with a four square inch overlap by screw fasteners in accordance with the prior art connection system.
Figure 3:
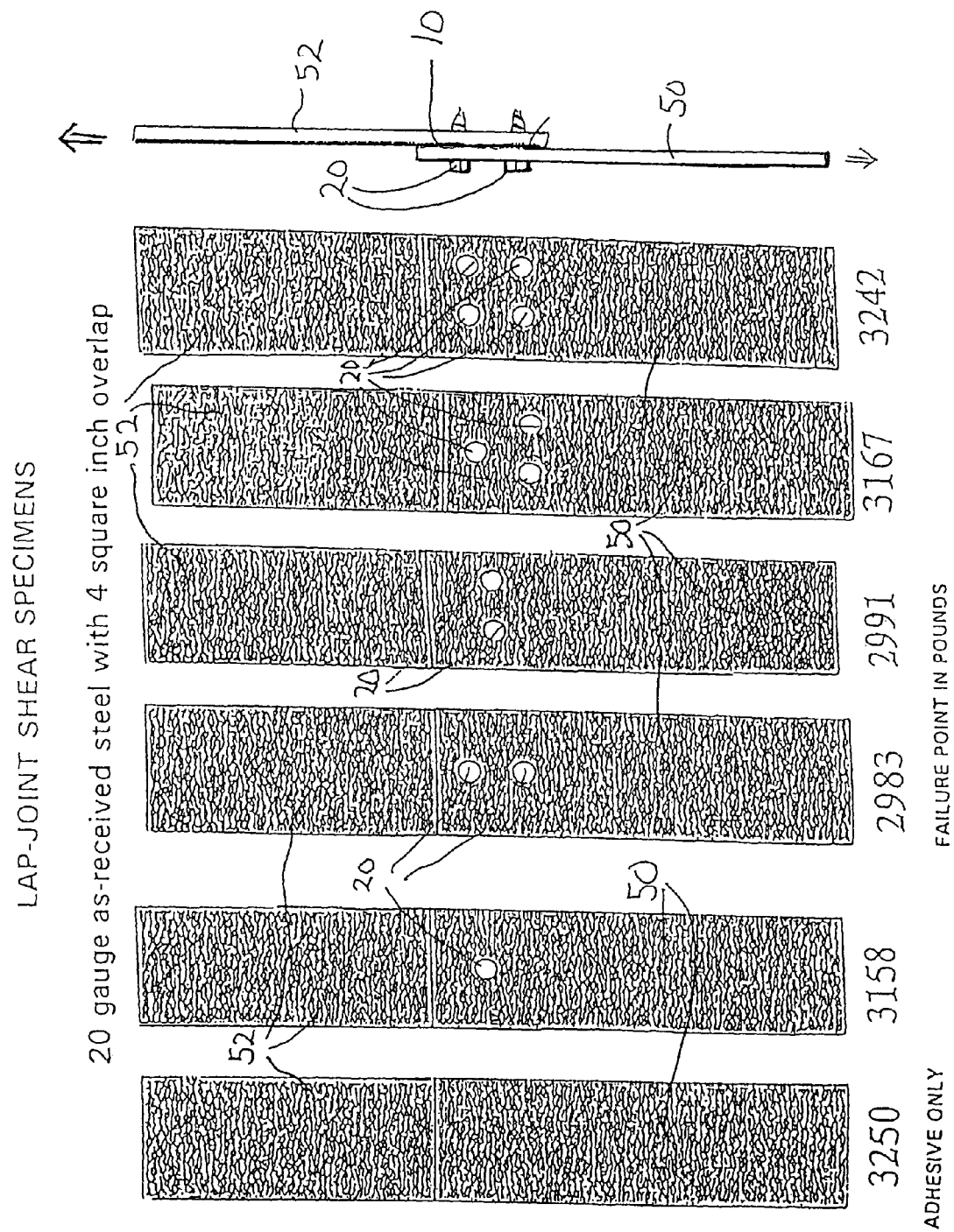
FIG. 3 is a schematic representational diagram for 20 gauge steel strips with a four square inch overlap which are connected by screw fasteners and adhesive in accordance with the connection system of the present invention.

The integrity of the adhesive/fastener connection system was demonstrated by lap-joint shear tests conducted on 20 gauge, as received, steel strips 50 and 52 which were connected with a four square inch overlap. FIG. 2 illustrates the integrity of the connection for various configurations wherein screws 20 only were employed. These connections were tested in shear with the corresponding quantities at the bottom illustrating the failure point of the connection in pounds. A side view illustrating the lap-joint and schematically representing the shear loading is at the extreme right of FIG. 2. When an adhesive 10 was also applied, the tests were repeated, and the results are illustrated in FIG. 3. A side view illustrating the lap joint and schematically representing the shear loading is at the extreme right of FIG. 3. It will be appreciated that the joint integrity was significantly enhanced.

FIGS. 4-7 illustrate the effect of push-pull cyclic loading on 4'×8' light gauge steel panels assembled to steel studs with only fasteners and with an adhesive/fastener combination. The resulting assembly is referred to as a "single sided diaphragm wall."

The push-pull cyclic load is applied to the top of the wall at 5 seconds per cycle. The resulting top-of-the-wall deflection is measured and plotted against the push-pull load. The resulting graphs show top-of-the-wall deflection lagging the applied load. The retardation of the effect when the forces acting upon a body are changed is defined as hysteresis. Push-pull tests were conducted under substantially equivalent conditions for the results of FIGS. 4-7. These hysteresis graphics demonstrate favorable test results for the adhesive/fastener connection system in accordance with the present invention. In comparison to connection systems which employ screws without adhesive, the results show superior adhesive and connection characteristics per fastener.

Figure 4:
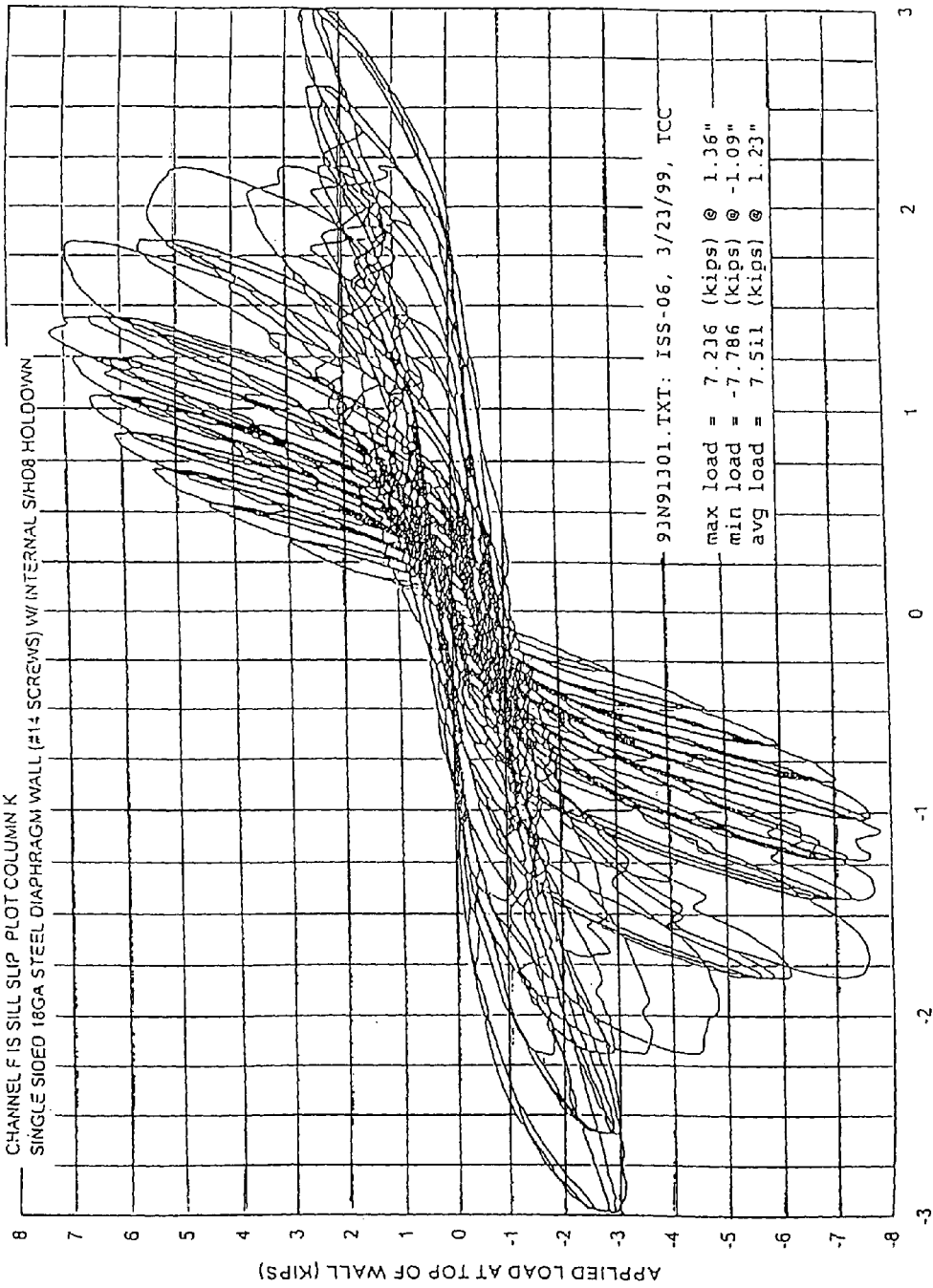
FIG. 4 is a hysteresis graph illustrating a push/pull deflection test for a single sided 18 gauge steel diaphragm wall employing No. 14 screws for fastening.

FIG. 4 is a hysteresis graph of a single sided 18-gauge steel diaphragm wall assembled with No. 14 self-drilling panel screws. The vertical axis is the applied load on top of the wall. The units are thousand pounds per square inch. The horizontal axis represents the top-of-the-wall deflection in inches.

Figure 5:
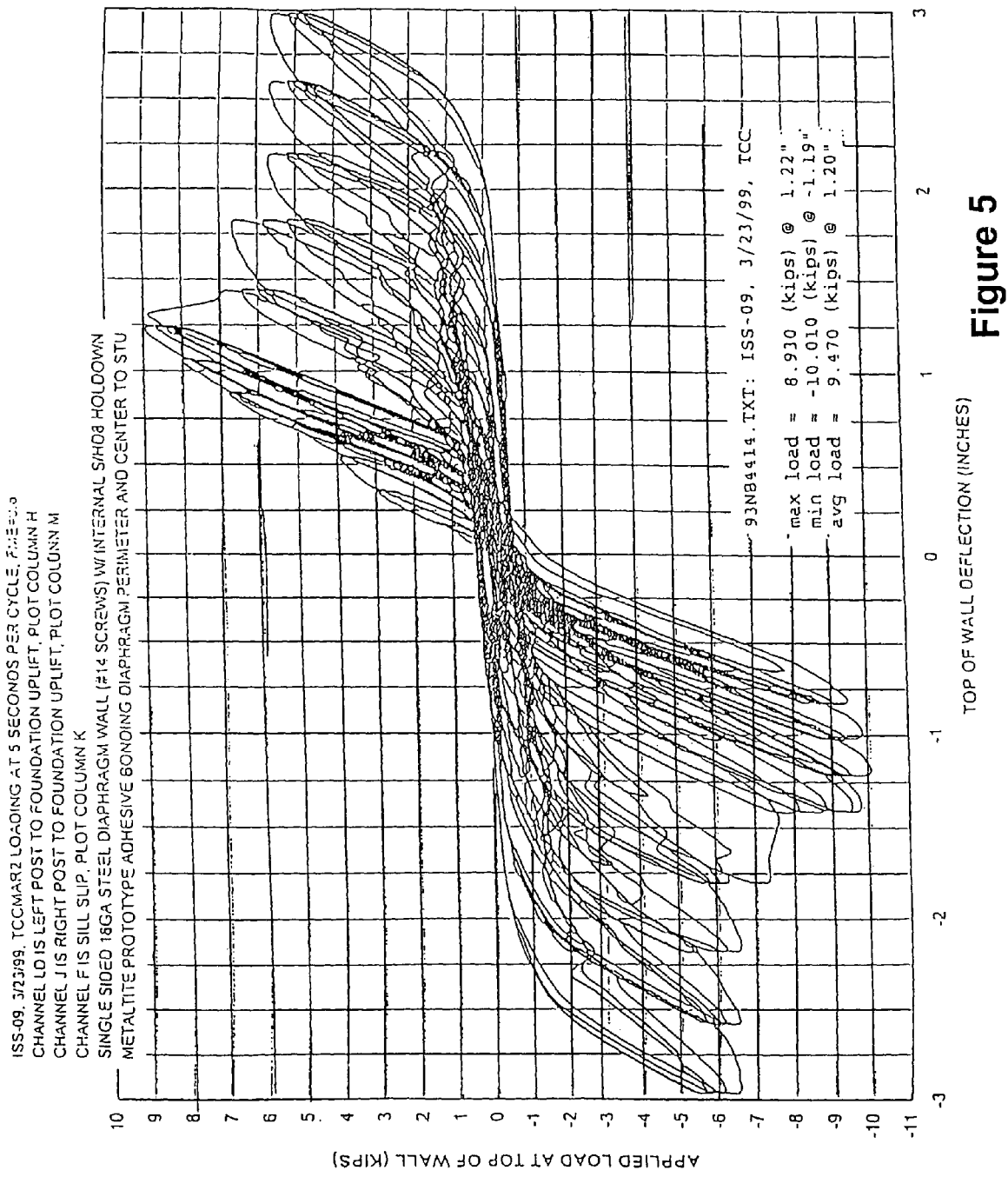
FIG. 5 is a hysteresis graph illustrating a push/pull deflection test for an 18-gauge steel diaphragm wall employing No. 14 screws and an adhesive bonding system for fastening in accordance with the present invention.

FIG. 5 shows the same 18-gauge steel diaphragm wall wherein No 1 self-drilling panel screws were fastened to connect the panels to the frame, and in addition, a prototype adhesive was applied at the perimeter and the center of the studs.

Figure 6:
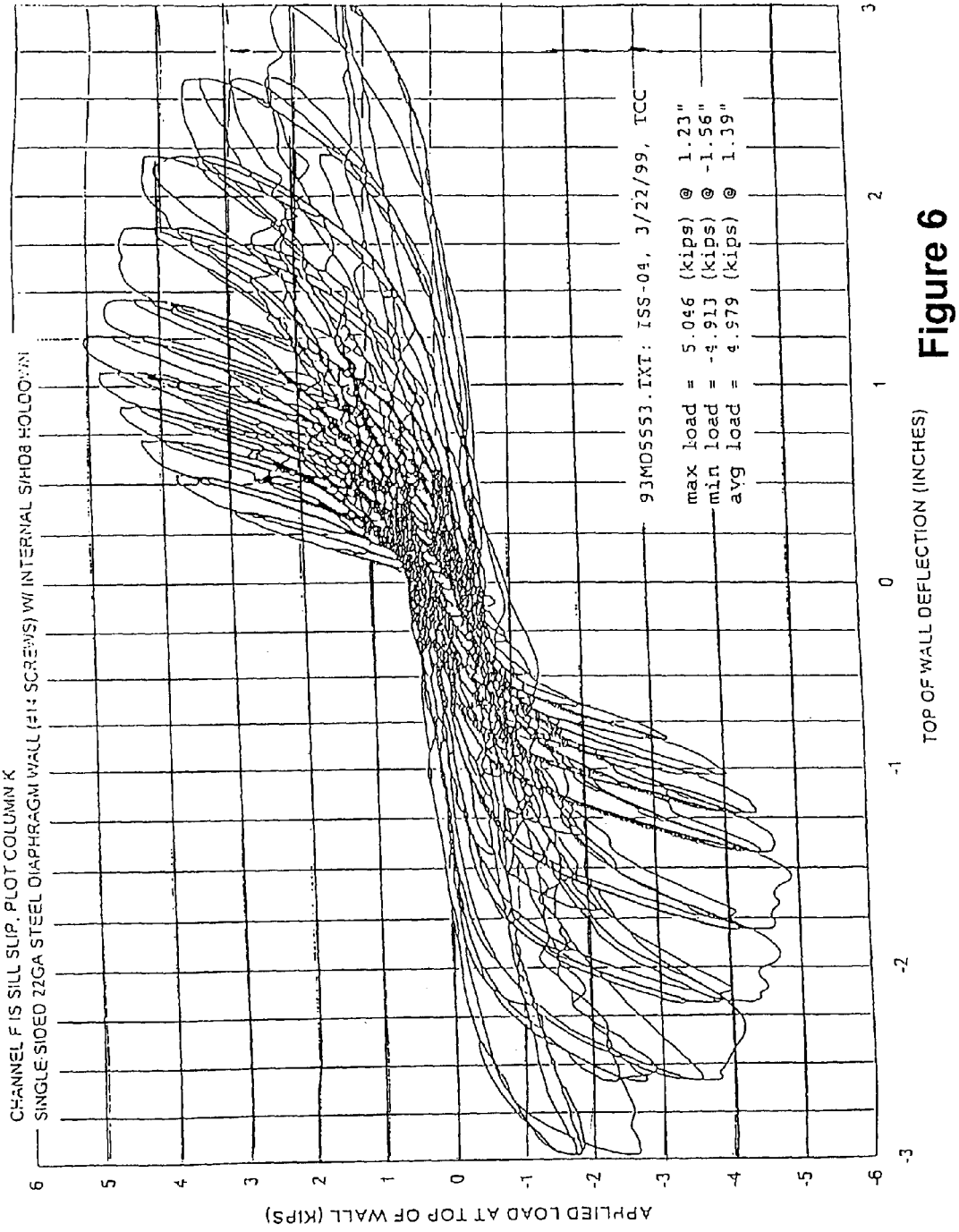
FIG. 6 is a hysteresis graph illustrating a push/pull deflection test for a single sided 22 gauge steel diaphragm wall employing No. 14 screws for fastening the panel.

FIG. 6 shows a hysteresis graph for a single sided 22 gauge steel panel wherein No. 14 self-drilling panel screws fasten the panel to the frame.

Figure 7:
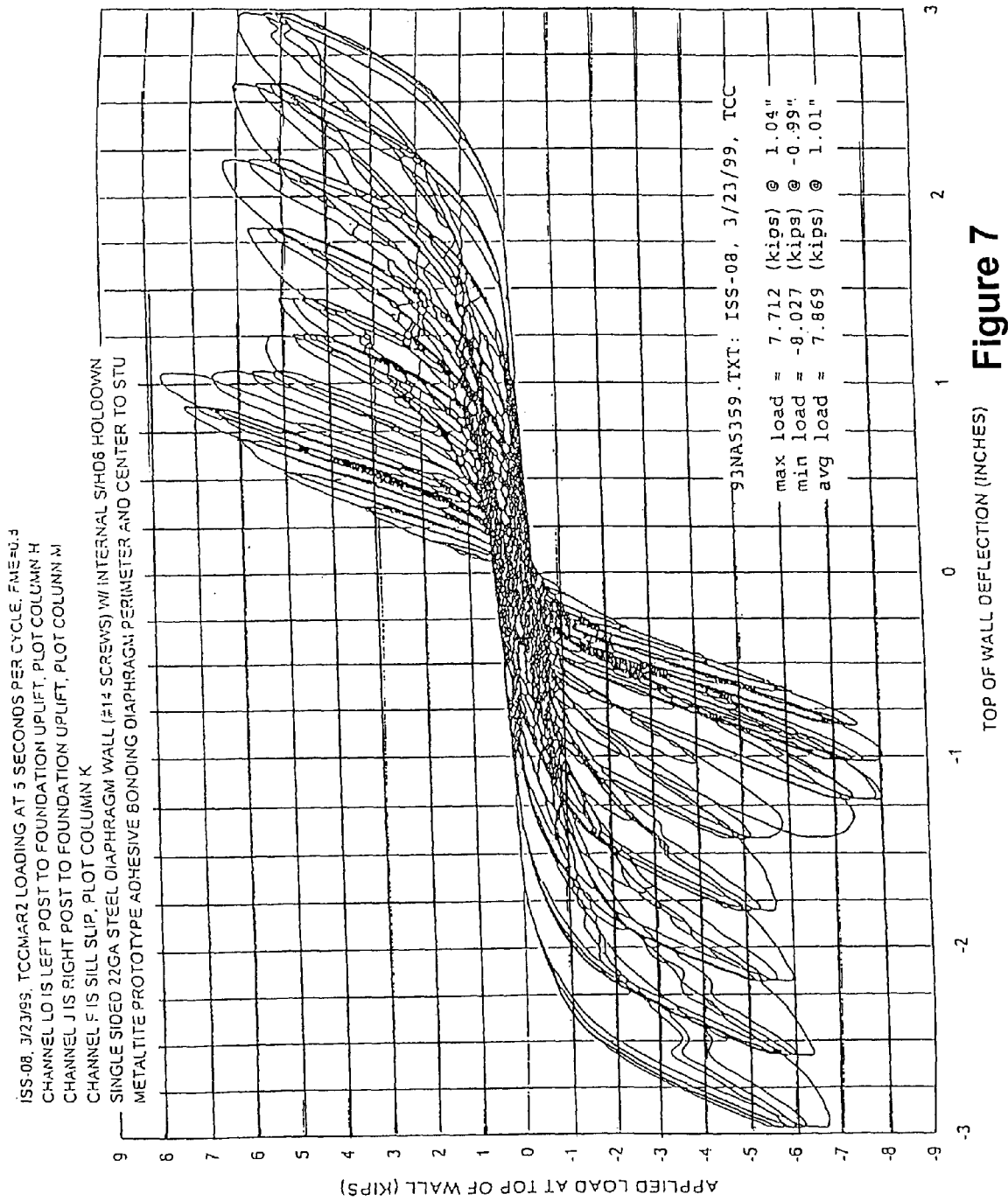
FIG. 7 is a hysteresis graph illustrating a push/pull deflection test for a single sided 22 gauge steel diaphragm wall employing No. 14 screws and an adhesive bonding system for fastening in accordance with the present invention.

FIG. 7 shows a hysteresis graph for the panel of FIG. 6 where, in addition, a prototype adhesive at the perimeter and the center of the studs was applied.

It should be appreciated that the hysteresis graphs clearly demonstrate that there is a superior connection by usage of the adhesive and the self-drilling screws.

The invention may also be employed with other mechanical fasteners such as screws of various types, pins, rivets and clinches. The invention may also be used with types of numerous support structures such as steel and metal studs, nonmetallic studs, framing, FRP plastics panel and plywood panel, etc.

Figure 10:
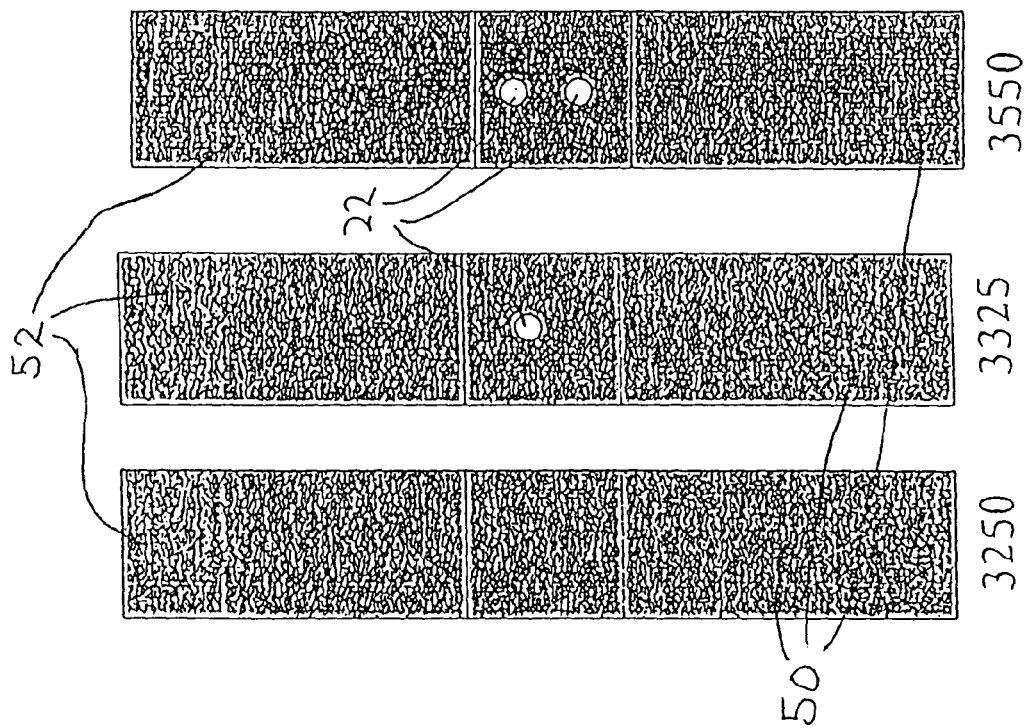
FIG. 10 is a schematic representational diagram for 20 gauge steel strips with a four square inch overlap which are connected by pin fasteners and adhesive in accordance with a connection system embodiment of the present invention.
Figure 9:
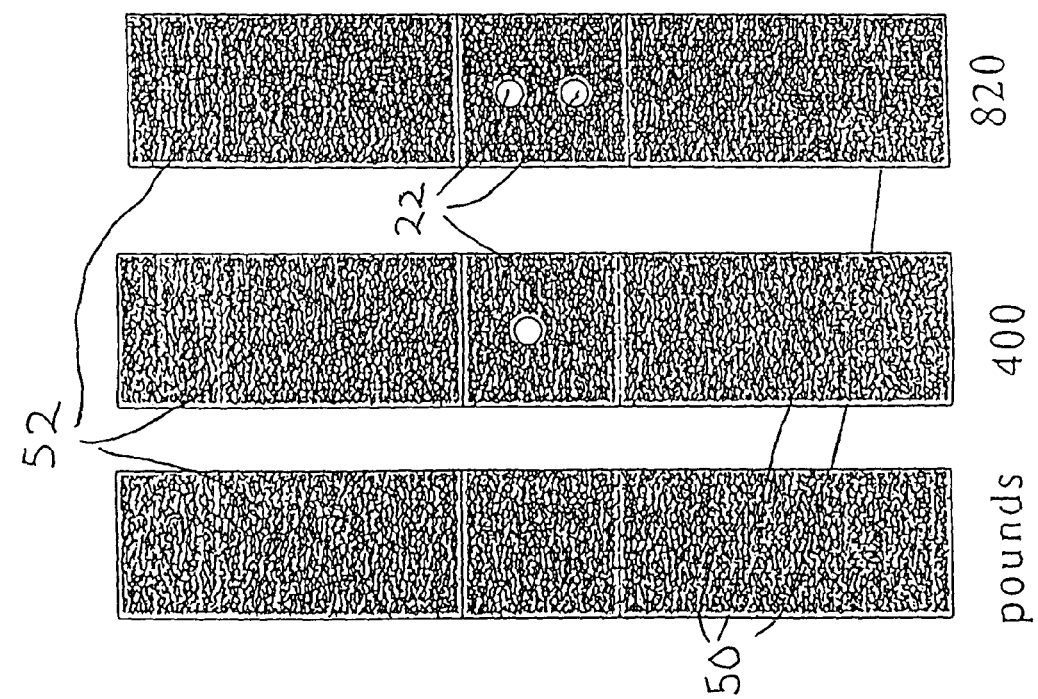
FIG. 9 is a schematic representational diagram illustrating a prior art connection system for 20 gauge steel strips which are connected with a four square inch overlap by pin fasteners in accordance with the prior art connection system.

With reference to FIGS. 9 and 10, the integrity of the adhesive/fastener connection system was demonstrated for pins by a lap-joint shear test conducted on 20 gauge, as received, steel strips 50 and 52, which were connected with a four inch square overlap in a manner similar to that described for FIGS. 2 and 3.

FIG. 9 illustrates the integrity of the connection for configurations wherein pins 22 only were employed. The pins 22 had a diameter of 0.100 inch and were driven by a pneumatic driver. These connections were then tested in shear with corresponding quantities at the bottom of the figure illustrating the failure point of the connection in pounds. When the adhesive 10, which was a two-part epoxy system, was also applied, the tests were repeated, and the results are illustrated in FIG. 10, wherein the failure point in pounds is indicated at the bottom. It should be appreciated that the joint integrity was significantly enhanced when both the adhesive and pins were employed as contrasted with the pins only.

It should be appreciated that under conventional systems which employ only mechanical fasteners, the light gauge steel components tend to flex, therefore, the fasteners will tend to work loose, and in some instances, totally withdraw from the assembly. Adding the adhesive reduces the flexibility of the interface between the light gauge steel and the various; connecting components and stiffens the overall connection, thus considerably reducing the tendency of fasteners to loosen, and also providing a cost advantage in that the use of a lighter gauge steel, in some instances, may be employed. In addition, the invention also facilitates the use of pins as the mechanical connecting fastener. In conventional systems, pins typically cannot be employed as the fasteners since they tend to loosen and work their way out of the connecting joint due to the flexure of the light gauge metal components.

Figure 11:
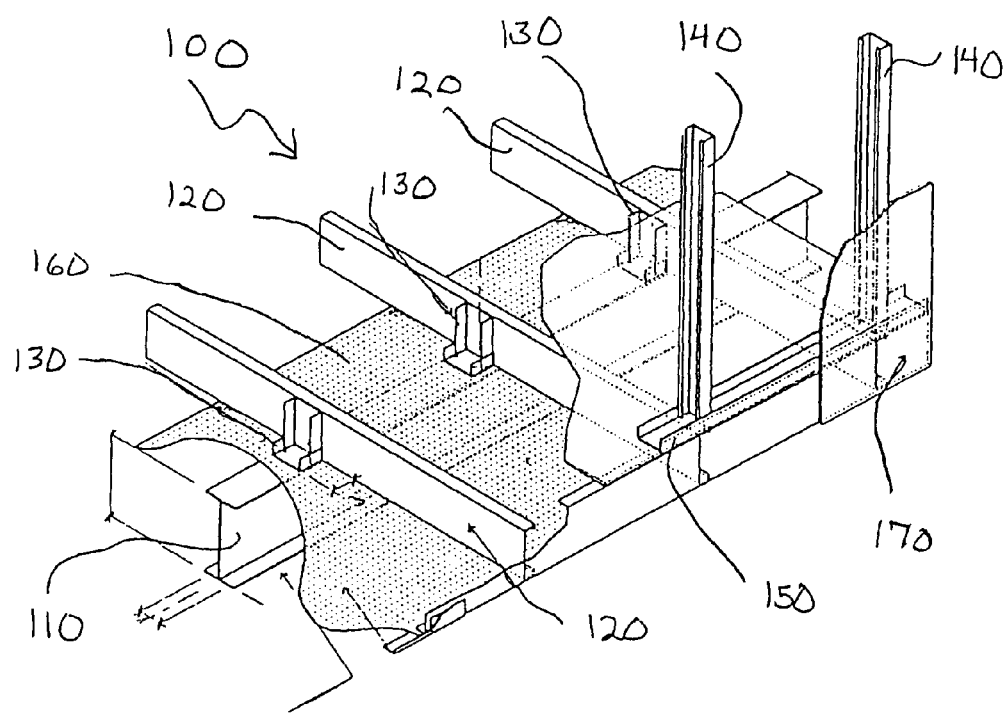
FIG. 11 is a schematic representational view showing how various components, joints and connections may be employed in a steel structure for which the invention has applicability.

Construction which involves steel components typically involves a number of components, connections and joints such as suggested by the semi-schematic assembly 100 illustration of FIG. 11, which includes main rail I-beams 110, floor joists 120, web stiffeners 130, studs 140, rim track 150, floor sheathing 160 and oriented strand board (OSB) 170 and wall hold-down anchors 180. The connection system may be employed to provide numerous connections which reduce the number of mechanical fasteners (and construction cost) required to provide the requisite integrity of the connection.

Figure 12:
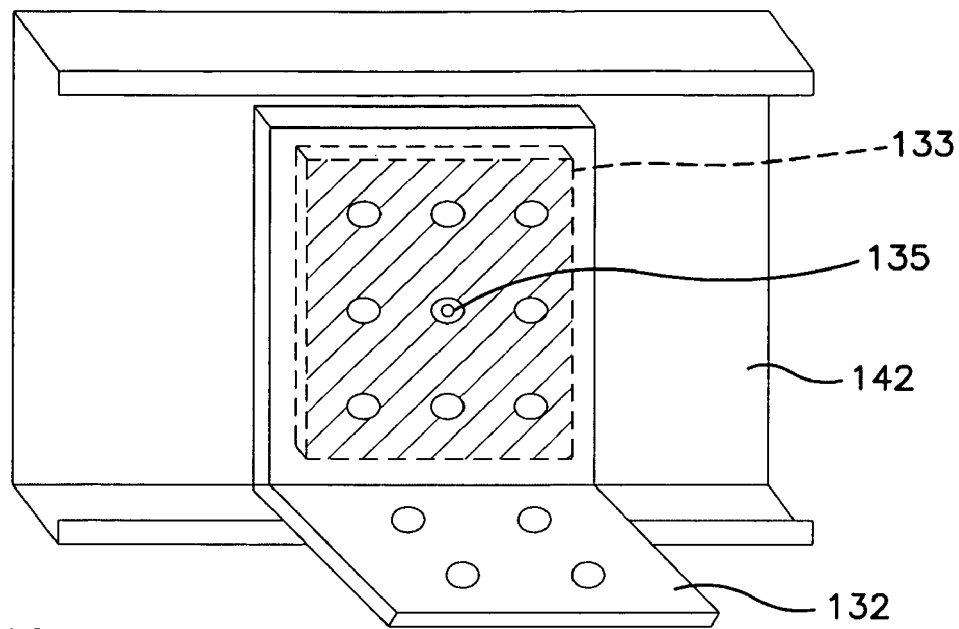
FIG. 12 is a perspective view, partly in phantom, illustrating a web stiffener connected to a C-stud by an adhesive and a fastener in accordance with a connection system embodiment of the present invention.

With reference to FIG. 12, a web stiffener 132 is bonded to a steel floor joist 142 employing the connection system of the present invention. The stiffener was bonded by an approximately ⅛" diameter bead of adhesive 133 and a single #10 self-drilling fastener 135 marketed by Grabber Construction Products of Concord, Calif. Two different adhesives have been employed. Epoxy formulation X243061 of Henkel Loctite Corp. of Rocky Hill, Conn. having a specific gravity of 1.16 and epoxy formulation Advanced Adhesive Systems 19041 JK having a specific gravity of 1.25 are each suitable to provide a sufficient bond for construction purposes. Henkel Loctite methyl methacrylate product H4600 is also suitable.

Figure 13:
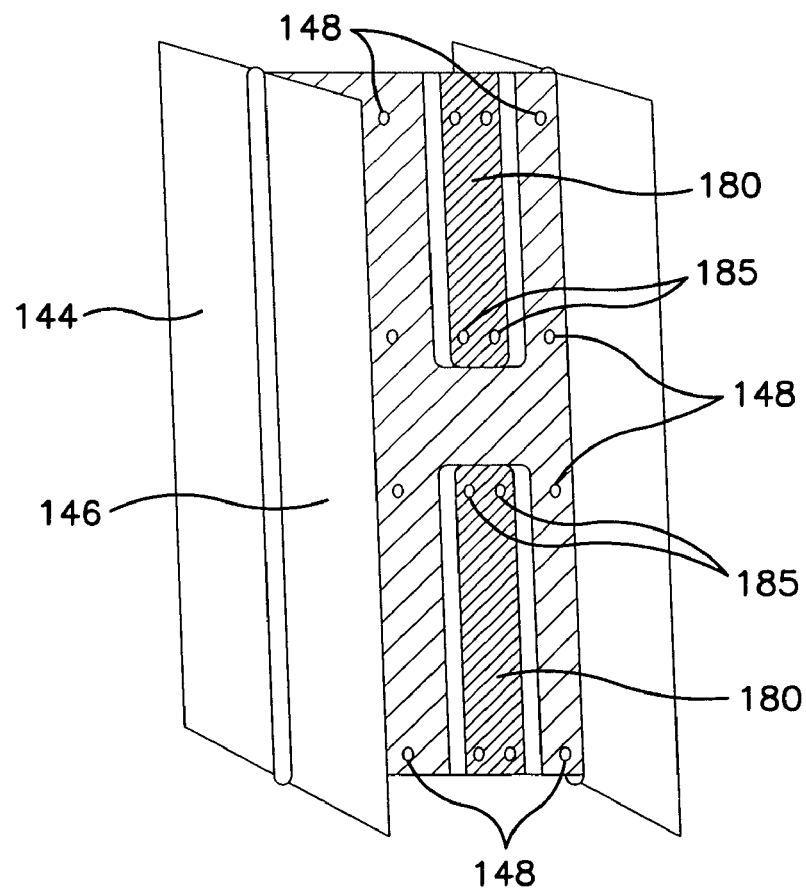
FIG. 13 is a perspective view illustrating a hold-down anchor connected to a C-stud assembly by means of an adhesive and fasteners in accordance with a connection system embodiment of the present invention.

The connection system also has application in connection with attaching hold-down anchors 180 to steel stud assemblies. As illustrated in FIG. 13, three feet, six inch, 16 gauge C-studs 144, 146 are connected in back-to-back relationship employing adhesive and eight Grabber #10 self-drilling screws 148. The studs are bonded with epoxy formulation X243061 adhesive of Henkel Loctite Corp. having a specific gravity of 1.16. Wall hold-down anchor 180 is bonded to the studs using the same adhesive with four self-drilling fasteners 185 as illustrated in FIG. 13. In addition, wall hold-down anchor 180 is also bonded to the studs using four fasteners 185 with an adhesive formulation 19041JK of Advanced Adhesive Systems.

Figure 14:
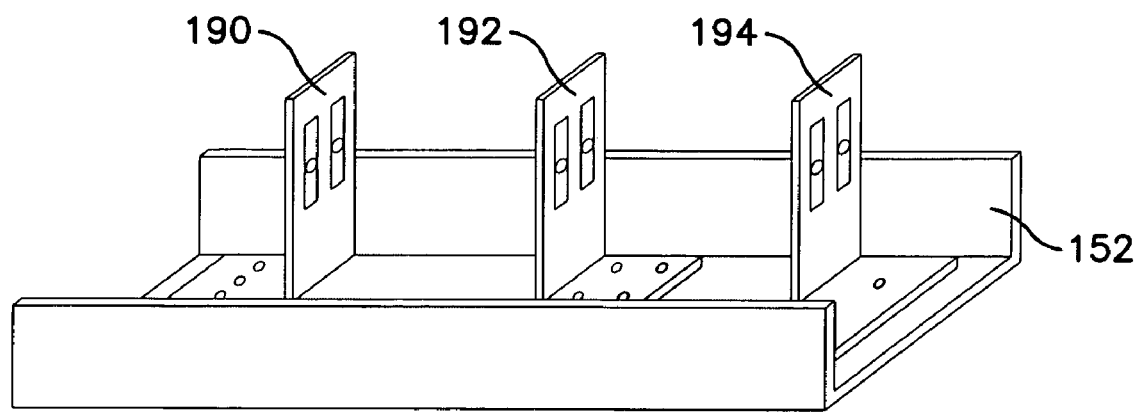
FIG. 14 is a perspective representational view illustrating vertical clips which have been connected to a C-channel by different embodiments of the connection system in accordance with the present invention.
Figure 15:
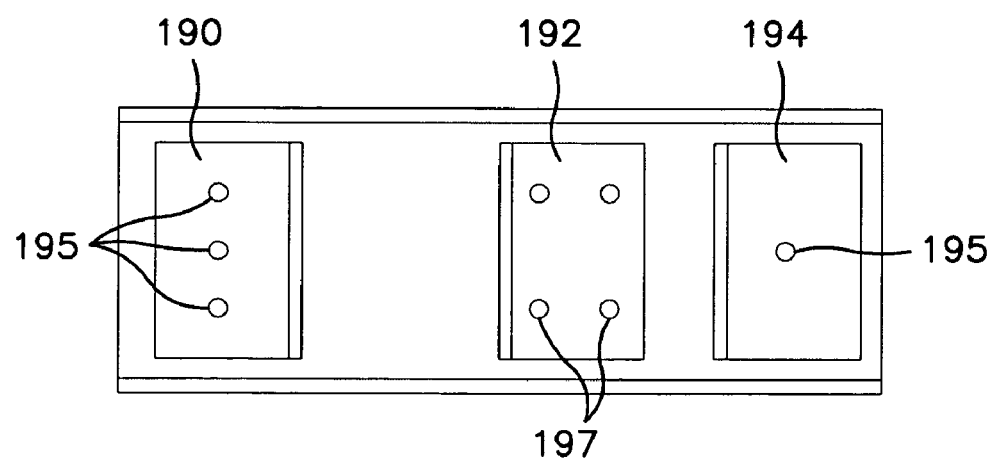
FIG. 15 is a top plan view of the vertical clips and channel of FIG. 14.

With reference to FIGS. 14 and 15, the connection system also has application in connection with a galvanized vertical clip 190. The clips are attached to the steel channel track 152 by adhesive and one or more mechanical fasteners 195. In one example, a 20 gauge vertical clip 190 is attached to the channel track 152 by three self-drilling fasteners 195 and Henkel Loctite Corp. H4600 methyl methacrylate adhesive. A second identical clip 190 is attached by four clinches 197 and the adhesive. Another identical clip 190 is attached by the adhesive and a single self-drilling fastener 195. In a first series of joints, Henkel Loctite Corp. H4600 methyl methacrylate adhesive is employed. Different types of bead adhesive configurations are employed for other joint series. The clip joint connections are sufficiently strong to meet the required design load.

Figure 16:
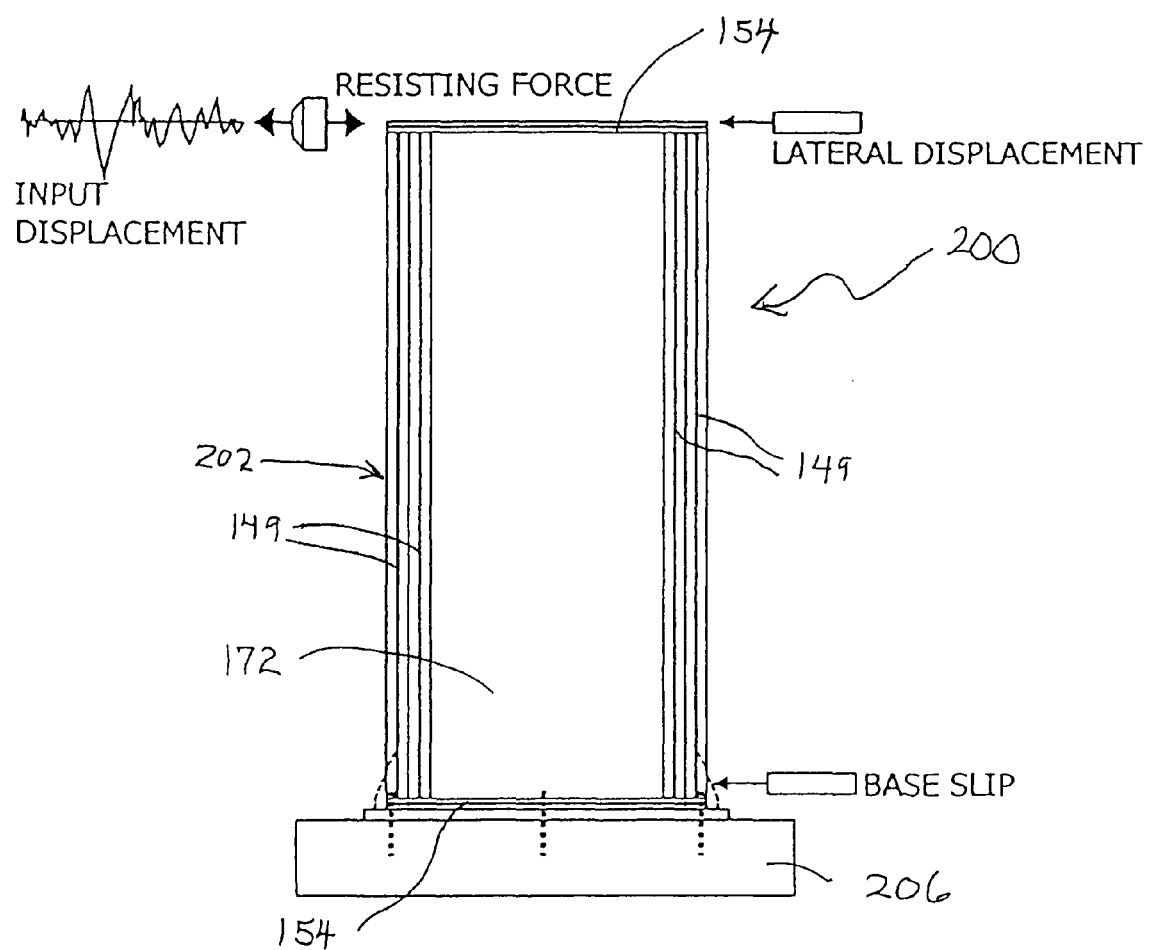
FIG. 16 is an elevational view, partly in schematic and partly in phantom, illustrating an application of the connection system of the present invention in connection with a light gauge steel frame and oriented strand board which forms a shear wall.

With reference to FIG. 16, the connection system also has application in connection with mounting oriented strand board (OSB) 172 to light gauge steel studs 149 to form shear walls 200 for various structures. To illustrate the applicability, 2'×8' shear walls 200 were constructed from 0.054" studs 149 which were mounted in back-to-back relationship. A pair of 0.054" tracks 154 were employed as the cross-members. A 7/16" OSB 172 was mounted to the light gauge steel frame 202. Various adhesives and fastener screw spacings were employed to attach the OSB 172 to the frame to construct various shear walls.

One shear wall was constructed using a methyl methacrylate adhesive (X243099 formulation of Henkel Loctite Corp.) which was applied as a bead around the front face of the frame. The OSB was then attached with screws which were fastened at a 2" on-center spacing.

A second shear wall was constructed using methyl methacrylate adhesive, except that the screws were fastened at a 6" on-center spacing.

A third shear wall was constructed using the methyl methacrylate adhesive and a 4" on-center screw spacing.

A fourth shear wall was constructed using an epoxy and a 4" on-center screw spacing. The epoxy was a X243097 formulation of Henkel Loctite Corp. and was dispensed in a 2:1 mix ratio. The shear walls were mounted to a base 206 and tested by a lateral displacement which was applied to the top wall, as schematically illustrated in FIG. 16. The resisting force was measured. The application of the adhesive in combination with a small number of mechanical fasteners showed a significant increase in stiffness and strength for the shear walls compared to the large number of screws conventionally used. In one test with No. 8 screws at 6" on-center for the sheathing edges, a nominal strength of the wall was determined to be 1655 pounds per feet and 1581 pounds per feet for the peak and reduced strength, respectively.

Figure 17:
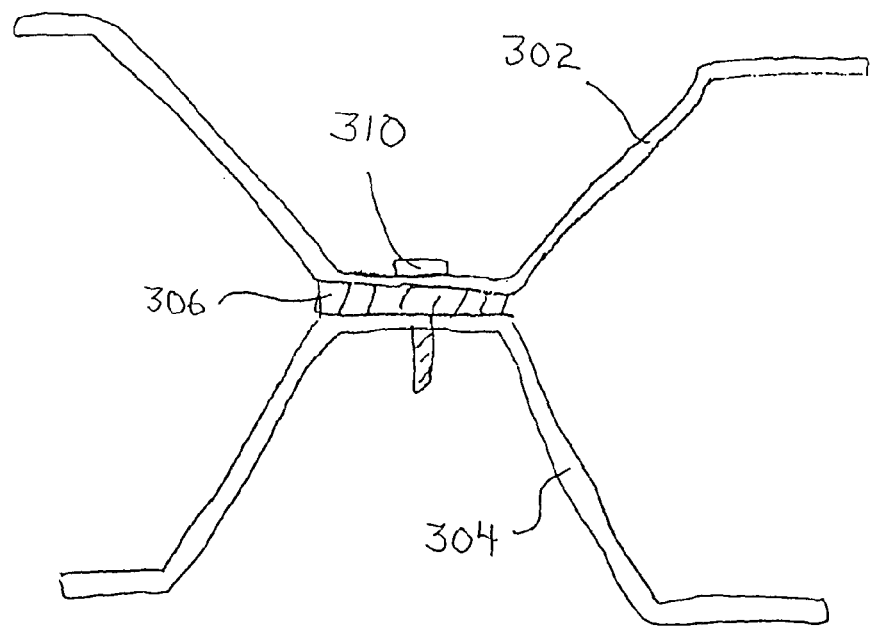
FIG. 17 is a cross-sectional view of a corrugated sheet metal connection implemented by an adhesive and a fastener in accordance with a connection system embodiment of the present invention.

With reference to FIG. 17, a pair of corrugated metal sheet members 302 and 304 are connected by applying an adhesive 306 between abutting ribs. Pneumatic pins 310 are then driven into the ribs at longitudinally spaced positions from one side of a rib to provide the connection. It should be appreciated that the pins 310 are spaced along the abutting corrugated ribs, at, for example, four inches on center, and that many fewer fasteners will be required than the conventional techniques which do not employ the adhesive fastener connection system.

Figure 18:
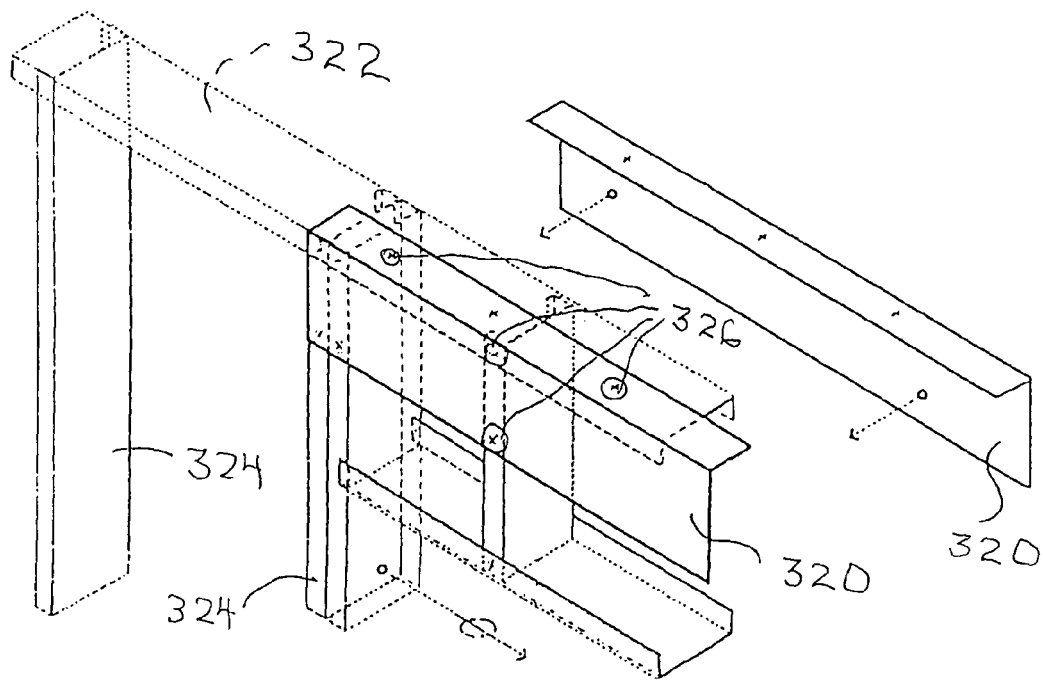
FIG. 18 is a perspective view, partly exploded and partly in phantom, of an L-shaped header connection to a metal header framework by means of a connection system embodiment of the present invention.

With reference to FIG. 18, an L-shaped header 320 which may, for example, be 1½" by 6", 8" or 10" is secured at the top of the wall track 322 which spans between studs 324 such as typically required for a header assembly for a door or window. The L-shaped header 320 is mounted and positioned by applying adhesive to the inside of the L-shaped header or the abutting track and stud edge, and then driving pneumatic pins 326 into the exterior surface of the L-shaped header. Many fewer pneumatically driven pins than the number of conventional fasteners typically employed without adhesives can be used to provide the requisite structural integrity of the connection system. For some applications, the construction system allows for the use of pneumatic pins which can be efficiently driven to provide connections which are strong and cost effective.

Figure 19:
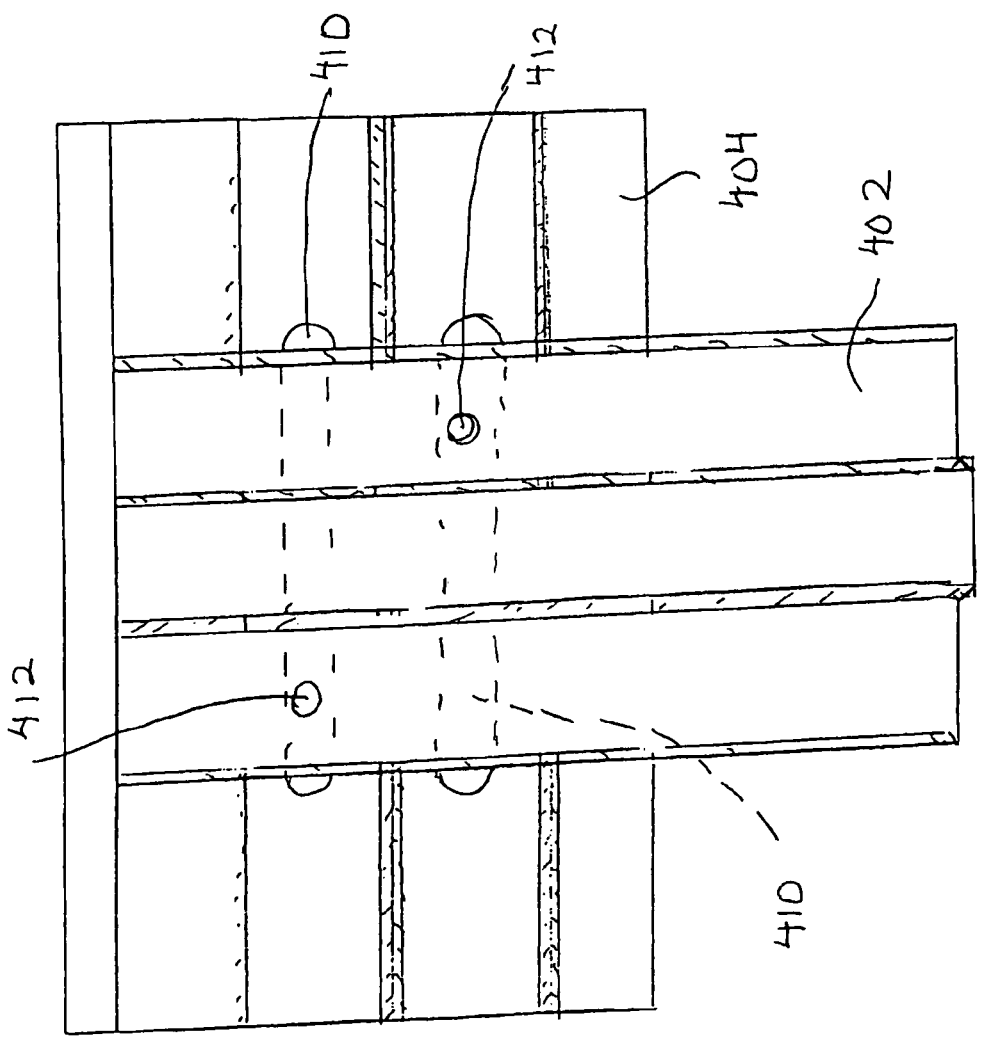
FIG. 19 is a fragmentary view illustrating a joint of a metal truss assembly which employs a connection system embodiment of the present invention.

With reference to FIG. 19, the connection system can also be applied for joining the web to a cord. The web 402 to a cord 404 of a trust assembly. An adhesive bead 410 is first applied to either the web or the cord. The components are then positioned in abutting relationship and pins 412 may be driven into one side to secure the members in position. When the adhesive cures, a joint of high integrity is formed.

Figure 20:
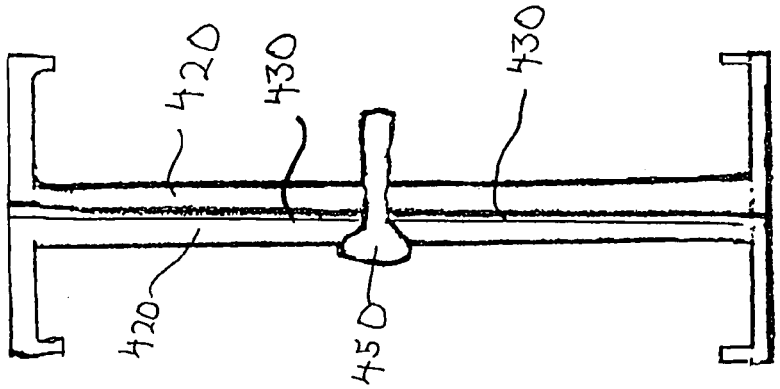
FIG. 20 is a sectional view of a pair of metal studs connected in back-to-back relationship by a connection system embodiment of the present invention.

It should also be appreciated that C-shaped metal studs 420 may be joined in back-to back relationship by applying an adhesive 430 to one of the surfaces and driving pins 450 through the studs as illustrated in FIG. 20. The studs 420 may be joined with a relatively wide spacing between the pins which typically exceeds 2" on center and is preferably 4" or 6" on center.

Figure 21:
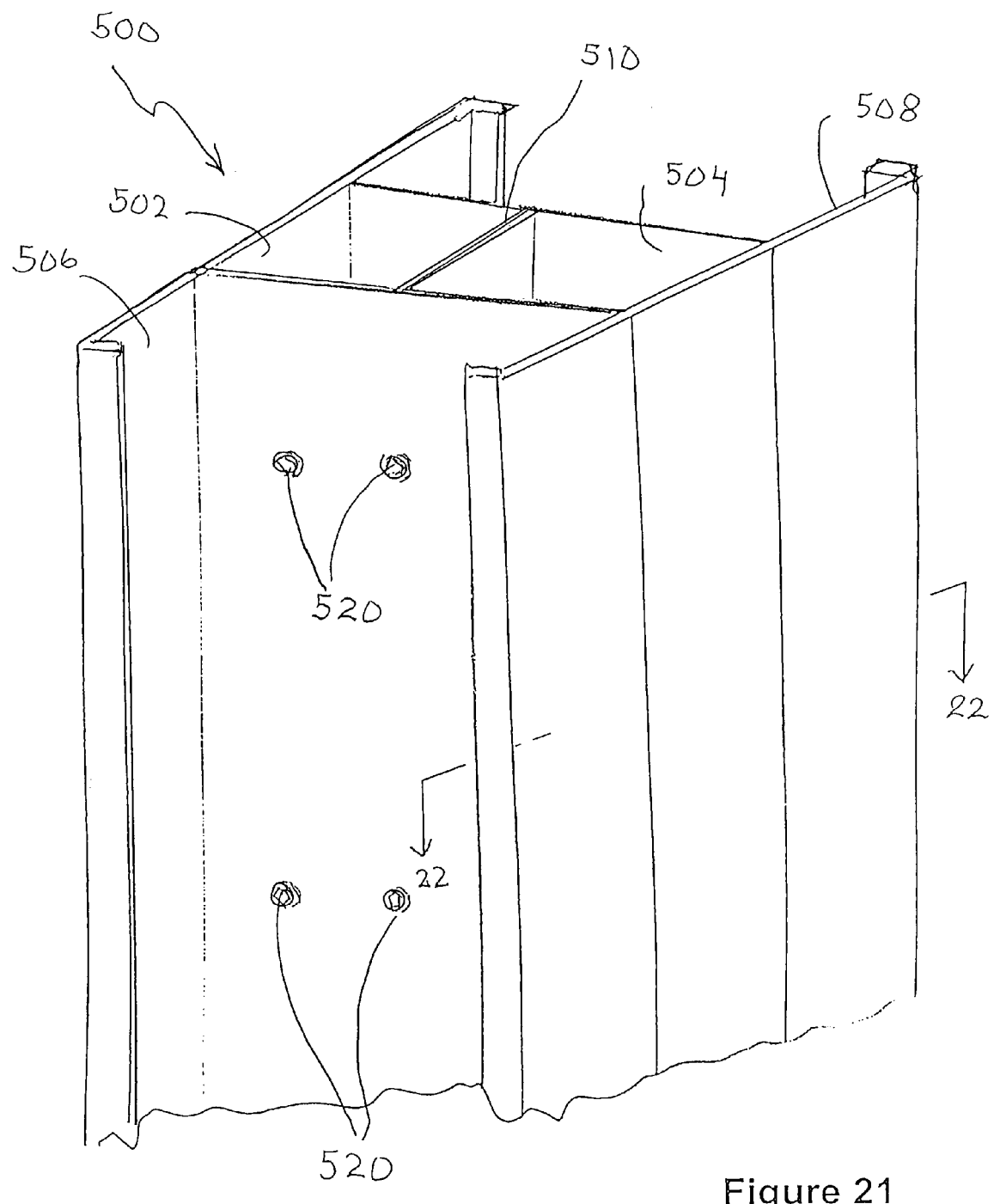
FIG. 21 is a perspective view of a support column constructed with a connection system embodiment of the present invention.
Figure 22:
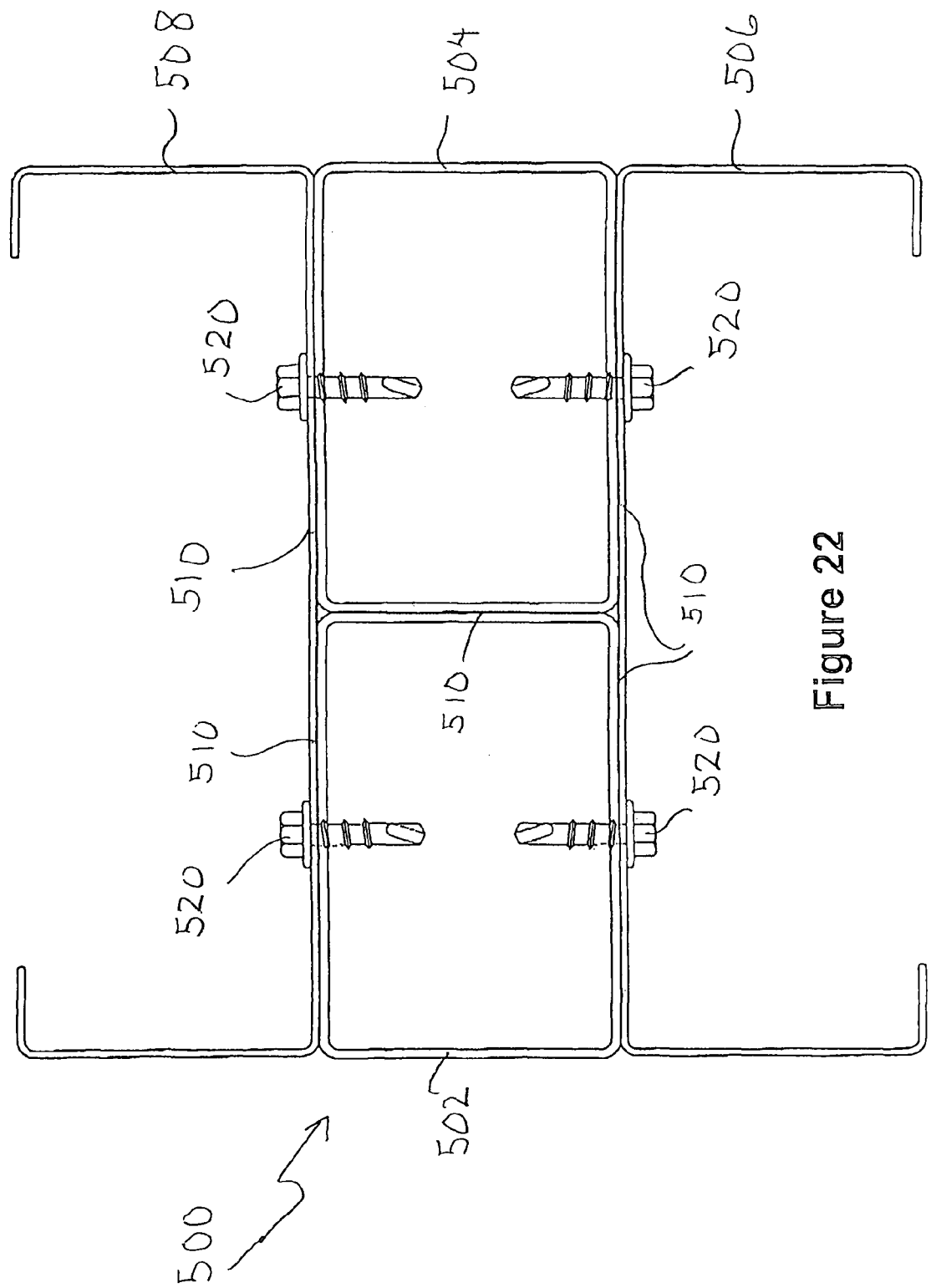
FIG. 22 is a sectional view of the support column of FIG. 21 taken along the line 22-22 thereof.

With reference to FIGS. 21 and 22, a metal support column for residential housing is generally designated by the numeral 500. The composite post which in one embodiment is 16' long is employed to present a 6" wide stud wall at the housing interior (not illustrated). The support column geometry is a design of LWM Design Associates Incorporated of Apple Valley, Calif. A pair of tubular 2"×3" steel posts 502, 504 are connected in side-by-side relationship by a continuous bead 510 of structural adhesive. C-shaped channel studs 506, 508 are bonded in surface-to-surface relationship at opposing sides of the composite tubes by means of structural adhesives 510 and fasteners 520 which are spaced at 8" on center. The studs 506, 508 are preferably 2"×6"×16' 16 gauge steel members. The components were bonded employing the structural adhesive which Henkel Loctite H4600 methyl methacrylate adhesive formulation and Metaltite® #12 self-drilling screws marketed by Olympic Manufacturing Group. The cost of construction of the support column 500 employing the connection system of the present invention represents a substantial savings over conventional I-beam type support columns. Moreover, if a conventional steel I-beam or support columns are employed, the interior finishing work would require that the interior structures be boxed. The support column 500, however, can present a structure where the wallboard can be screwed directly into the support column.

Figure 23:
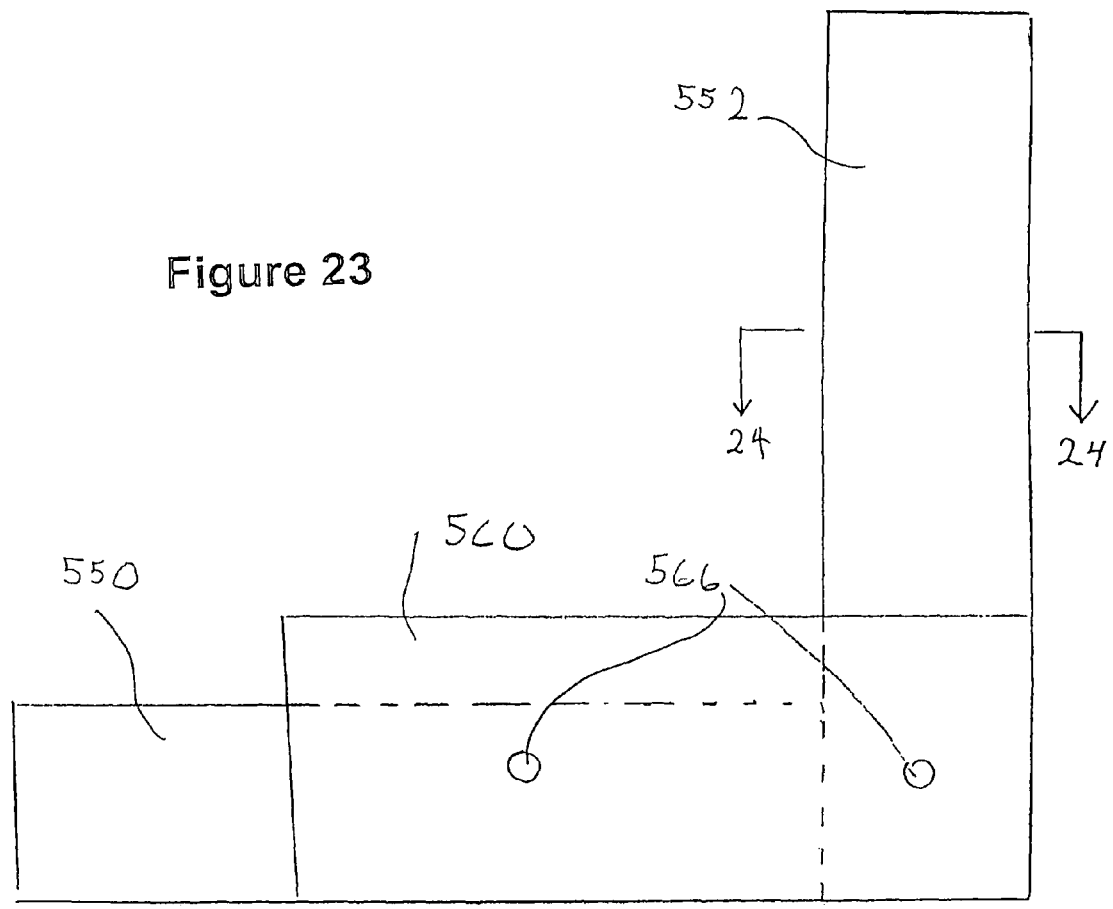
FIG. 23 is a side view, partly in phantom, of a pair of square tubes joined by a connection system embodiment of the present invention.
Figure 24:
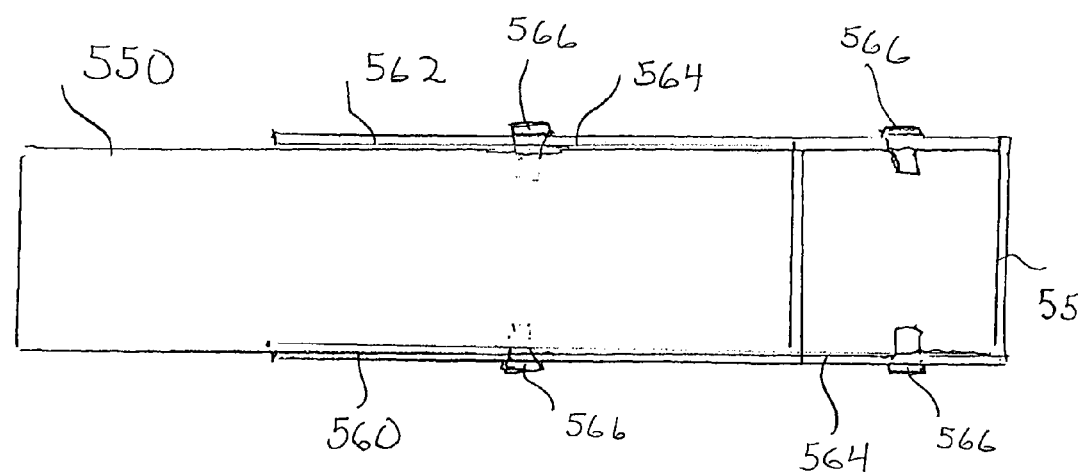
FIG. 24 is a sectional view of the tube assembly of FIG. 23 taken along the line 24-24 thereof.

With reference to FIGS. 23 and 24, the connection system is also employed to join square metal tubes 550 and 552 in perpendicular relationship. A pair of metal plates 560 and 562 are placed at opposite sides and secured against abutting adjacent portions of the tubes by structural adhesive 564 and a pair of fasteners 566 to provide the joint. An analogous joint for an end-to-end connection can also be implemented.

While the foregoing description sets forth preferred embodiments of the invention, the foregoing description should not be deemed a limitation of the invention herein. Other adaptations, modifications and alternatives may occur to one skilled in the art without departing from the spirit and scope of the present invention.

What is claimed is:

1. A method for connecting a light gauge steel panel to a structural support frame comprised of steel members comprising:

applying an adhesive to at least one of said panel or support frame, said adhesive being curable at room temperature and able to adhere to steel;

placing said panel against said support frame;

driving a plurality of fasteners through the panel into said support frame to provide an aggregate mechanical connection to maintain said panel in position against said support frame when said support frame is positioned in an upright orientation; and allowing said adhesive to cure to form a bonding interface between said panel and said frame, so that said panel is joined to said frame along said bonding interface in a connection wherein the shear connection resistance to a shear load applied parallel to said panel is substantially entirely provided by the bonding interface which is significantly greater in load bearing capacity than the aggregate mechanical connection provided by the fasteners.

2. The method of claim 1, wherein said step of applying adhesive further comprises applying a bead of adhesive.

3. The method of claim 2, further comprising applying a bead of adhesive to both said panel and said support frame.

4. The method of claim 1, wherein the fastener is selected from the group consisting of self-drilling screws, rivets, pins and clinches.

5. The method of claim 1, wherein each said fastener is a self-drilling screw and the step of driving a plurality of fasteners includes contemporaneous drilling into said support frame.

6. The method of claim 1, wherein said adhesive is composed of a material selected from the group consisting of epoxy, methacrylate and urethane.

7. An assembly for a building comprising:
a metal support frame comprising pairs of opposed metal members;
a panel of light gauge steel mounted to said support frame;
a plurality of mechanical fasteners connecting said panel to said support frame and having an aggregate mechanical load bearing capacity sufficient to retain the panel to the support frame; and
a structural adhesive curable at room temperature disposed between said support frame and said panel and forming a bonding interface between said panel and said members,
so that said panel is joined to said frame in a connection wherein the connection resistance to a shear load applied parallel to said panel is substantially entirely provided by the bonding interface which is significantly greater in load bearing capacity than that of the aggregate mechanical load bearing capacity of the fasteners.

8. The assembly of claim 7, wherein the fastener is selected from the group consisting of self-drilling screws, rivets, pins, and clinches.

9. The assembly of claim 7, wherein each said fastener is a self-drilling screw.

10. The assembly of claim 7, wherein said adhesive is a two-part epoxy system.

11. The assembly of claim 10, wherein said epoxy system comprises a resin and hardener which are mixed in substantially equal portions by weight.

12. The assembly of claim 10, wherein said epoxy system comprises a resin and hardener which are mixed in substantially equal portions by volume.

13. The assembly of claim 7, wherein said adhesive fully cures within approximately 72 hours.

14. A building having a steel superstructure and comprising at least one structural module, said module comprising:
an upright rectangular metal support frame having a dimension of at least 2'×8' and further comprising pairs of opposed metal members;
a panel of light gauge steel;
a plurality of mechanical fasteners connecting said panel to each of said members and having an aggregate mechanical load bearing capacity sufficient to retain the panel to the support frame; and
a structural adhesive curable at room temperature disposed between said support frame and said panel and forming a bonding interface between said panel and each of said members,
so that said panel is joined to said frame in a connection wherein the connection resistance to a shear load applied parallel to said panel is substantially entirely provided by the bonding interface which is significantly greater in load bearing capacity than that of the aggregate mechanical load bearing capacity of the fasteners.

15. The building of claim 14, wherein each said fastener is a self-drilling screw.

16. The building of claim 14, wherein said adhesive is a two-part epoxy system.

17. The building of claim 14, wherein said epoxy system comprises a resin and hardener which are mixed in substantially equal portions by weight.

18. The building of claim 14, wherein said epoxy system comprises a resin and hardener which are mixed in substantially equal portions by volume.

19. The building of claim 14, wherein the fasteners are selected from the group consisting of self-drilling screws, rivets, pins and clinches.

20. The building of claim 14, wherein said adhesive is selected from the group consisting of epoxy, methacrylate and urethane.

21. A shear wall comprising:
a metal support frame comprising pairs of laterally spaced metal studs;
a panel of oriented strand board mounted to said support frame;
a plurality of mechanical fasteners connecting said panel to said support frame wherein the mean distance between said fasteners is at least two inches and having an aggregate mechanical load bearing capacity sufficient to retain the panel to the support frame; and
a structural adhesive disposed between said support frame and said panel and forming a bonding interface between said panel and said studs,
so that said panel is joined to said frame in a connection wherein the connection resistance to a shear load applied parallel to said panel is substantially entirely provided by the bonding interface which is significantly greater in load bearing capacity than that of the aggregate mechanical load bearing capacity of the fasteners.

22. The assembly of claim 21, wherein said fasteners are self-drilling screws.

23. The assembly of claim 21, wherein said fasteners are pins.

24. The assembly of claim 21, wherein said adhesive is a two-part epoxy system.

25. A sub-assembly for a framework of a structure comprising:
a C-shaped metal member having a web disposed between a pair of spaced metal edge strips;
a metal component mounted to said web;
at least one mechanical fastener connecting said component to said web and having an aggregate mechanical load bearing capacity sufficient to retain the component to the web; and
a structural adhesive disposed between said component and said web and forming a bonding interface between said component and said web,
so that said component is joined to said member in a connection wherein the connection resistance to a shear load applied to said connection is substantially entirely provided by the bonding interface which is significantly greater in load bearing capacity than that of the aggregate mechanical load bearing capacity of the at least one fastener and is greater than the load required to deform the component.

26. The sub-assembly of claim 25, wherein each fastener is selected from the group consisting of self-drilling screws, rivets, pins, and clinches.

27. The sub-assembly of claim 25, wherein each said fastener is a self-drilling screw.

28. The sub-assembly of claim 25, wherein said adhesive is a two-part epoxy system.

29. The sub-assembly of claim 25 wherein said component is a web stiffener.

30. The sub-assembly of claim 25 wherein said component is a wall hold-down anchor.

31. The sub-assembly of claim 25 wherein said component is a vertical clip.

32. The sub-assembly of claim 25 wherein said member is a stud.

33. The sub-assembly of claim 25 wherein said member is a cross-channel member.

34. The sub-assembly of claim 25 wherein each said member and said component is a stud.

35. The sub-assembly of claim 34 wherein each said fastener is a pin component.

36. The sub-assembly of claim 25 wherein said component is an L-shaped header.

37. A sub-assembly for a framework of a structure comprising:
a first metal member having a first longitudinally extending planar strip;
a second metal member having a second longitudinally extending planar strip;
a structural adhesive disposed between said first strip and said second strip and forming a bonding interface between said first strip and said second strip,
at least one mechanical fastener extending through said strips; and
so that said first member is joined to said second member in a connection wherein the connection resistance to a shear load applied to said connector is substantially entirely provided by the bonding interface which is significantly greater in load bearing capacity than the load required to deform either the first member or the second member.

38. The sub-assembly of claim 37 wherein said first member is a cord and said second member is a web of a truss assembly.

39. The sub-assembly of claim 37 wherein said first member and said second member are each corrugated metal sheets.

40. The sub-assembly of claim 37 wherein said first member and said second member are each metal studs.

41. A support column comprising:
a pair of elongated metal tubes disposed in parallel side-by-side relationship;
a first C-shaped elongated metal stud having a first planar surface mounted against a first side of each said tube and connected thereto by a structural adhesive disposed between said first planar surface and each said first side and a plurality of longitudinally spaced fasteners fastening said first stud to each said first side; and
a second C-shaped elongated stud having a second planar surface mounted against a second side of each said tube, said second side being opposite said first side and connected thereto by a structural adhesive disposed between said second planar surface and each said second side and a plurality of longitudinally spaced fasteners fastening said second stud to each said second side.

42. The support column of claim 41 wherein said fasteners are self-drilling screws.

43. The support column of claim 42 wherein said screws are longitudinally spaced at approximately 8" on center.

44. The support column of claim 41 wherein said structural adhesive is a methyl methacrylate adhesive.

45. A sub-assembly for a structure comprising:
a first steel tube;
a second steel tube abutting said first tube;
a metal plate abutting aligned planar surfaces of said first and second tubes;
a structural adhesive disposed between said plate and each said planar surface;
a first fastener extending between said plate and a side of said first tube; and
a second fastener extending between said plate and a side of said second tube.

46. The sub-assembly of claim 45 further comprising:
a second metal plate transversely spaced from said first plate and abutting aligned planar surfaces of said first and second tubes;
a structural adhesive disposed between said second plate and abutting planar surfaces;
a third fastener extending between said second plate a second side of said first tube; and
a fourth fastener extending through said plate and a second side of said second tube.

* * * * *